United States Patent [19]

Grosclaude

[11] Patent Number: 5,185,196

[45] Date of Patent: Feb. 9, 1993

[54] METHOD FOR ASSEMBLY OF LAMINATE ARTICLE

[75] Inventor: Gary V. Grosclaude, Winsted, Conn.

[73] Assignee: Dymax Corporation, Torrington, Conn.

[21] Appl. No.: 612,961

[22] Filed: Nov. 15, 1990

[51] Int. Cl.$^5$ .................. B32B 23/02; B32B 31/00
[52] U.S. Cl. .................... 428/194; 29/602.1; 29/609; 156/273.7; 156/275.3; 156/275.7; 156/305; 156/314; 156/332; 336/217; 336/234
[58] Field of Search .............. 156/273.7, 275.3, 275.7, 156/305, 314, 332; 29/602.1, 609; 428/194; 336/217, 234

[56] References Cited

U.S. PATENT DOCUMENTS

| | | | |
|---|---|---|---|
| 3,222,626 | 12/1965 | Feinberg et al. | 336/234 |
| 4,429,088 | 1/1984 | Bachmann | 526/135 |
| 4,948,656 | 8/1990 | Schoen | 336/234 |
| 4,963,220 | 10/1990 | Bachmann et al. | 156/307 |
| 4,964,938 | 10/1990 | Bachmann et al. | 156/273.7 |

*Primary Examiner*—John J. Gallagher
*Attorney, Agent, or Firm*—Ira S. Dorman

[57] ABSTRACT

An activated oil formulation provides a surface layer upon the faces of a transformer coil stack, to which is subsequently applied a layer of a polymerizable liquid adhesive composition. The adhesive composition is curable by both chemically induced and photo-induced reactions, and the oil formulation includes a chemical cure initiator for the adhesive composition. A coated laminate stack is produced in which fully cured fillets of the solid coating extend between the plates and bond together their confronting marginal portions.

14 Claims, No Drawings

METHOD FOR ASSEMBLY OF LAMINATE ARTICLE

BACKGROUND OF THE INVENTION

It is common practice to form solid coatings upon electric current transformers to afford structural stability, corrosion resistance, and enhanced aesthetics. Such coatings also help to minimize vibration of the coil stack lamina, and to thereby attenuate the audible hum that applied currents would otherwise tend to produce.

The plates from which transformer stacks are constructed are normally coated with a lubricating oil to aid in assembly; needless to say, therefore, any superimposed coating formulation must be capable of curing in the oil-laden environment. Although compositions known in the art are well-adapted for such applications, it is not believed that there has heretofore been provided a satisfactory method for producing an encapsulating coating upon a transformer coil stack without the undesirable displacement or dissolution of the oil, and while enabling the thorough curing of the coating composition, as is essential to the proper functioning of the transformer.

It is therefore the broad object of the present invention to provide an effective and facile method for the production of a fully cured solid coating upon a laminate article, and in particular upon a transformer coil stack, which coating affords structural strength and stability, enhanced aesthetics, and protection to the part, while also serving to bond the lamina to one another so as to minimize vibration and humming.

A more specific object of the invention is to provide such a method in which the laminated plates are lubricated with oil, and in which the coating composition extends between confronting plates and is effectively and thoroughly cured, to leave virtually no unreacted polymerizable material.

Other objects of the invention are to provide a laminate article consisting of a stack structure on which is formed a solid coating, wherein fully cured fillets of the coating material are disposed between the plates of the structure, and serve to bond the marginal portions to thereby attenuate vibration.

SUMMARY OF THE INVENTION

It has now been found that certain of the foregoing and related objects of the invention are attained by the provision of a method for producing a laminate article fabricated from a multiplicity of metal plates, assembled as a stack. An activated oil formulation is applied to one face of the stack, provided by outer edges of the plates lying on a common plane, so as to produce a surface layer thereupon with some of the formulation extending, to at least a significant depth, between confronting marginal portions of the plates. The activated oil formulation used is comprised primarily of an oil ingredient, suitable for lubricating the plates, admixed with an effective amount of a chemical cure initiator. A polymerizable liquid adhesive composition is applied over the oil formulation layer, the composition being compatible with the oil ingredient and being formulated to cure to a solid coating and to bond to the plates, through reaction induced chemically by the initiator and also through photo-induced reaction. The coated face of the stack is thereafter exposed to radiation of appropriate wavelength to effect the photo-induced reaction; full curing of the composition, to produce a solid coating on the face and bonding of the plates, is achieved through the reactions so induced.

In some embodiments the metal plates will be covered with a lubricating oil during assembly, and the oil formulation, containing an oil ingredient that is readily miscible with the lubricating oil, will be subsequently applied; in other cases the metal plates will be covered with the oil formulation during assembly. Both the adhesive composition and also the oil formulation may advantageously be applied by spraying. The plate will generally have outer edges that lie on a multiplicity of contiguous common planes and that provide a multiplicity of faces on the stack, to all of which faces the oil formulation and adhesive composition will be applied. Most desirably, the plates will be made from steel and the article produced will be a transformer for electric current.

In especially preferred embodiments, the adhesive composition will include a photoinitiator that is activated by ultraviolet radiation, and the adhesive composition will contain a substantial amount of at least one polymerizable acrylate monomer. In such cases the cure initiator in the oil formulation may be an active oxygen-containing, free-radical generating catalyst. More desirably however the cure initiator in the oil formulation will be an amine-aldehyde condensation product, and the adhesive composition will include an active oxygen-containing catalyst that is reactive therewith to produce the free radicals.

Other objects of the invention are attained by the provision of an article of manufacture made by the method described. The article will comprise a laminate stack, assembled from a multiplicity of plates, and it will in most instances take the form of an electric current transformer.

DETAILED DESCRIPTION OF THE PREFERRED EMBODIMENTS

Illustrative of the efficacy of the present invention is the following specific example, in which all parts and percentages are on a weight basis:

EXAMPLE ONE

An electric current transformer is produced on a high-speed machine by assembling a number of steel plates about an electric coil. The plates form a laminate stack of rectangular configuration, with edges disposed on four contiguous, mutually perpendicular common planes. They are covered with a layer of the lubricating oil utilized to facilitate assembly, which is a product known as "Cook's Industrial Oil No. 1924," and is believed to be a light-weight mineral oil having a viscosity of approximately 100 centipoise.

The transformer is supported in a jig, and is rotated while a formulation of the same lubricating oil, containing approximately 12 percent of an amine-aldehyde condensation product commercially available from R.T. Vanderbuilt Company under the trade designation VANAX 808, is sprayed upon its exposed surfaces. Thereafter, a liquid adhesive composition, also having a viscosity of about 100 centipoise, is sprayed upon the surfaces of the transformer over the layer of activated oil formulation. The adhesive composition contains 60 parts of hydroxyethyl methacrylate (HEMA), 40 parts of a HEMA-capped urethane prepolymer, 4 parts of t-butyl perbenzoate, 50 parts per million of ferric sulfate, 1.5 parts per hundred of maleic acid, and 4.5 parts of 1-hydroxycyclohexylphenyl ketone, as an ultraviolet light-responsive photoinitiator. The adhesive-coated laminate stack is then exposed to ultraviolet radiation for a period of about 3 seconds, whereupon a tack-free skin quickly develops on the coating.

The encapsulated transformer is tested after a brief period of time, and is found to function, under an impressed current conforming to its specified rating, without producing any audibly perceptible hum. Its outer surfaces are covered by a tough and smooth, contiguous layer of the cured coating material, and upon destructive analysis the coating material is found to have also penetrated to a depth of about 20 millimeters between the marginal portions of confronting plates, and to have produced a fully cured strong bond therebetween; no residual, unreacted adhesive composition is in evidence.

It will be appreciated that the activated oil formulation may be used during assembly of the plates, or may be applied in a subsequent step, as in the foregoing Example. In the latter instance, the oil ingredient utilized must of course be compatible and readily miscible with the lubricating oil used for assembly purposes; it should also possess such viscosity and surface tension characteristics as will promote its penetration, or "wicking," between the lamina.

The adhesive composition may be of any appropriate species, including for example the acrylates, the epoxies, silicone resins, polyurethanes, polyimides, etc., all of which are well known to those skilled in the art. However, the acrylate adhesive compositions are preferred, and further description thereof might be taken from U.S. Pat. Nos. 4,429,008, issued Jan. 31, 1984, 4,963,220, issued Oct. 16, 1990, and 4,964,938, issued Oct. 23, 1990, teaching both directly and by reference a wide variety of acrylate adhesives; the specifications of those patents are hereby incorporated hereinto by reference, to the extent helpful in exemplifying the adhesive compositions that are suitable for use in the practice of the present invention.

Needless to say, the specific character of the adhesive composition employed will be a fundamental determinant of the oil formulation constituents and, in particular, of the additive used for initiating chemical reaction. As indicated above, the initiator will typically be a catalyst or a component of a two-part system; its critical function is of course to initiate curing in areas not adequately exposed to the actinic radiation (i.e., to promote "shadow curing"). Thermal energy may sometimes be used to increase the rate of cure, but the effects of prolonged heating may be detrimental in certain cases.

As noted, the coating system preferred for use herein will constitute an acrylate-based adhesive composition, and an oil formulation containing an amine-aldehyde condensation product as the activator. The adhesive formulation may comprise, more particularly, at least one polymerizable acrylate monomer, at least one elastomeric domain-providing filler, and a perester catalyst in an amount sufficient, when activated, to effectively initiate polymerization of the monomer; advantageously, it will also include about 0.5 to 5.0 percent by weight of an organic acid (usually maleic) which is capable of cyclic tautomerism, and about 2.0 to 6.0 weight percent of acrylic acid.

Suitable acrylate monomers that might be mentioned include isobornyl acrylate, isobornyl methacrylate, hydroxyethyl methacrylate, hydroxypropyl methacrylate, polyethyleneglycol dimethacrylate, trimethylcyclohexyl acrylate, trimethylcyclohexyl methacrylate, benzyl methacrylate, butyleneglycol dimethacrylate, polybutyleneglycol dimethacrylate, and mixtures thereof. The elastomeric domain-providing filler will advantageously be an acrylated polyurethane oligomer, especially a diisocyanate-capped polyether acrylated by reaction with hydroxyethyl acrylate or hydroxyethyl methacrylate, having a molecular weight of about 400 to 6,000. The monomer and elastomeric domain-providing filler will normally constitute about 30 to 60 and 5 to 60 weight percent, respectively, of such an adhesive composition. The catalyst will preferably be either tertiary-butyl perbenzoate or tertiary-butyl peroctoate, although other known perester catalysts are also effective.

As to amine-aldehyde condensation products that may be used, particularly desirable results are attained when the amine moiety of the condensation product is aromatic, and most especially when it is aniline; other aromatic amines that may be of comparable advantage are ethylaniline and o-toluidine. Similarly, while a variety of different aldehydes may be employed to produce the activator, n-butylraldehyde is perhaps most often used and results in an especially effective product when condensed with aniline; other of the aldehydes that are known for use in producing such adducts may however be found to be suitably substituted. Generally, the amine-aldehyde condensation products will be most effective at a concentration of 5 to 20 percent, based upon the weight of the oil formulation.

As will be appreciated by those skilled in the art, a metal ion may beneficially be utilized in such an acrylate system, introduced either from the adhesive composition or from the oil formulation. For example, the ferric ion may be provided by incorporating ferric sulfate, ferric chloride, ferrocene or ferric acetylacetonate; corresponding cupric and ferrous salts may also be used.

With regard to the filler for an acrylate system, virtually any material that is soluble (to at least a significant degree) in the monomer fraction, and that serves to toughen, flexibilize and/or strengthen the cured composition, may be used. The filler need not be introduced as a rubbery solid; liquids and waxy substances are also entirely suitable. It is most desirable that the filler be reactive with the monomeric components to produce intermolecular bonding, since that will enhance compatibility and tend to maximize the ultimate properties of the adhesive.

Although the selection of specific appropriate elastomeric domain-providing fillers will be evident to those skilled in the art, it might be mentioned that typical suitable materials include vinyl polymers, acrylic polymers, polyester elastomers, glycol polymers, acrylated epoxies, natural and synthetic rubbers, and the like. In many instances, the urethane polymers and prepolymers will be preferred, with the latter being especially desirable due to the potential that they afford for further reaction of their pendant isocyanate groups with a reactive functionality (e.g., an hydroxyl group) provided by a suitable acrylate monomer.

It is emphasized that use of the acrylate system is regarded to promote implementation of the best mode for carrying out the invention. The foregoing discussion of such systems is therefore provided in that spirit, and should not be deemed to limit the invention to any particular species of adhesive composition or oil formulation ingredient.

In addition to the components referred to, it will be evident that other materials may also be incorporated into the adhesive compositions employed herein. For example, "inert" fillers, such as wood flour, glass fibers, cotton linters, mica, alumina, silica, and the like, are conventionally used to modify viscosity, improve impact resistance, and for other purposes, and they may be employed in the instant coating compositions if so desired. Other substances, such as dyes, fire retarders, stabilizers (e.g., the quinones and hydroquinones), thixotropes, thickeners, viscosity reducers, plasticizers, antioxidants, and the like, may additionally be incorporated.

The viscosity characteristics of both the oil and also the adhesive composition are of considerable importance. They should normally be of relatively low value for good penetration (where needed) and facile application, consistent with the avoidance of undue dripping or sagging of the liquid films and layers produced; viscosities of 100 centipoise or less will often produce optimal results. The crucial factor is to ensure that a sufficient amount of the initiator comes into contact with all portions of the adhesive composition (including those portions that penetrate between the plates) so as to avoid the presence of any residual, unreacted polymerizable material. In any event, to be most effective for bonding of the marginal portions of the plates it is believed that the solid fillets of cured adhesive should be at least 10, and preferably at least 20, millimeters wide. The composition should also cure to exhibit a steel-to-steel tensile strength of at least about 2,000 psi.

The apparatus by which the oil formulation and adhesive composition are applied, and by which the transformer parts are handled, may be very simple or relatively complex, and may involve spraying, roller coating, dipping, curtain coating, or any other suitable technique. Application of the liquid components may be achieved manually or automatically, utilizing (in the latter case) suitable transport means to carry the parts through stations for coating, irradiation and curing.

Thus, it can be seen that the present invention provides a highly effective and facile method for the production of a solid coating upon a laminate article, and in particular a transformer coil stack, to afford structural stability, enhanced aesthetics, protection, and bonding of the lamina to minimize vibration and humming. The method employs a coating composition that is effectively cured to produce secure bonding between marginal portions of the plates, while leaving virtually no unreacted polymerizable material. The invention also provides a laminate article in which fully cured fillets of the coating material are disposed between the plates of the stack structure, and bond the marginal portions thereof so as to thereby attenuate vibration.

Having thus described the invention, what is claimed is:

1. In a method for the production of a laminate article fabricated from a multiplicity of metal plates, said plates being assembled as a stack and having marginal portions with outer edges lying on at least one common plane providing one face of said stack, the improvement wherein said method comprises the steps of:

applying to said plates an activated oil formulation comprised primarily of an oil ingredient that is suitable for lubricating said plates, and in admixture with said oil ingredient, an effective amount of a chemical cure initiator, said formulation providing a surface layer upon said one face of said stack and extending, to at least a significant depth, between confronting marginal portions of said outer edges of said plates;

applying over said oil formulation layer a polymerizable liquid adhesive composition compatible with said oil ingredient and formulated to cure to a solid coating, and to bond to said plates, by reaction induced chemically by said initiator and also by photo-induced reaction; and thereafter exposing said face of said stack to radiation of appropriate wavelength value to effect said photo-induced reaction, full curing of said composition to produce a solid coating on said face and bonding of said plates being achieved through said chemically induced and photo-induced reactions.

2. The method of claim 1 wherein said metal plates are covered with lubricating oil during assembly, and wherein said oil formulation is subsequently applied to said one face of said stack, said oil ingredient of said formulation being readily miscible with said lubricating oil.

3. The method of claim 2 wherein said steps of applying are effected by spraying said oil formulation and said coating composition upon said stack.

4. The method of claim 1 wherein said metal plates are covered with said oil formulation during assembly.

5. The method of claim 1 wherein said plates have outer edges lying on a multiplicity of contiguous common planes and providing a multiplicity of faces on said stack, said oil formulation and adhesive composition being so applied to all of said faces, and thereafter being so exposed.

6. The method of claim 5 wherein said plates are made from steel.

7. The method of claim 6 wherein said article additionally includes an electric oil within said stack of plates, and is a transformer for electric current.

8. The method of claim 1 wherein said adhesive composition includes a photoinitiator that is activated by ultaviolet radiation, and wherein said appropiate wavelength value lies within the ultraviolet spectral region.

9. The method of claim 1 wherein said adhesive composition contains a substantial amount of at least one polymerizable acrylate monomer.

10. The method of claim 9 wherein said cure initiator in said oil formulation is an active oxygen-containing, free-radical generating catalyst.

11. The method of claim 10 wherein said stack is heated to promote reaction of said adhesive composition.

12. The method of claim 9 wherein said cure initiator in said oil formulation is an amine-aldehyde condensation product reactive with an active oxygen-containing catalyst to produce free radicals, and wherein said adhesive composition includes such a catalyst.

13. An article of manufacture produced by the method of claim 1.

14. The article of claim 13, additionally including an electric coil within said stack of plates, wherein said plates are made of steel and have outer edges lying on a multiplicity of contiguous common planes and providing a multiplicity of faces on said stack, said oil formulation and adhesive composition being applied in the manner recited to all of said faces, and thereafter being exposed in the manner recited, and wherein said article is an electric current transformer.

* * * * *

UNITED STATES PATENT AND TRADEMARK OFFICE
CERTIFICATE OF CORRECTION

PATENT NO. : 5,185,196
DATED : February 9, 1993
INVENTOR(S) : Gary V. Grosclaude It is certified that error appears in the above-identified patent and that said Letters Patent is hereby corrected as shown below:

Claim 1, column 5, line 61, insert --and-- before the word "providing."

Claim 7, column 6, line 36, delete "oil" and substitute therefor --coil--.

Claim 12, column 6, line 53, delete "containg" and substitute therefor --containing--.

Signed and Sealed this

Second Day of November, 1993

*Attest:*

BRUCE LEHMAN

*Attesting Officer*   Commissioner of Patents and Trademarks